United States Patent [19]

Poole

[11] Patent Number: 5,779,429
[45] Date of Patent: Jul. 14, 1998

[54] MECHANISM ALLOWING QUICK IMPLEMENT ATTACHMENT TO TRACTORS

[75] Inventor: James E. Poole, Newbury, Ohio

[73] Assignee: Kendall Manufacturing, Inc., Lawrenceville, Ga.

[21] Appl. No.: 711,251

[22] Filed: Sep. 10, 1996

[51] Int. Cl.$^6$ .................................................. B66C 23/00
[52] U.S. Cl. ........................... 414/723; 37/468; 403/321
[58] Field of Search .............................. 414/723; 37/468; 403/321; 172/272–275

[56] References Cited

U.S. PATENT DOCUMENTS

| | | |
|---|---|---|
| 3,572,759 | 3/1971 | Baugh . |
| 4,068,959 | 1/1978 | Pemberton . |
| 4,397,604 | 8/1983 | McCain . |
| 4,436,477 | 3/1984 | Lenertz et al. . |
| 4,643,631 | 2/1987 | Maurer et al. . |
| 4,747,612 | 5/1988 | Kuhn ........................... 172/275 |
| 4,836,741 | 6/1989 | St. Louis et al. . |
| 4,846,624 | 7/1989 | Hohn ........................... 172/275 X |
| 4,854,812 | 8/1989 | Smith et al. . |
| 4,984,958 | 1/1991 | Kaczmarczyk . |
| 4,986,722 | 1/1991 | Kaczmarczyk et al. . |
| 5,010,960 | 4/1991 | Barnes et al. . |
| 5,141,385 | 8/1992 | Tibbatts et al. . |
| 5,332,353 | 7/1994 | Arnold ........................... 172/275 X |
| 5,382,110 | 1/1995 | Perotto et al. . |

FOREIGN PATENT DOCUMENTS 1277608  11/1965  Germany .

*Primary Examiner*—Donald W. Underwood
*Attorney, Agent, or Firm*—Hinkle & Associates, P.C.

[57] ABSTRACT

A quick implement attachment mechanism (2) utilizes a single coupling unit having two receiving sides (18) interconnected by a longitudinal beam (20). Each receiving side of the mechanism will engage a pair of vertically aligned pins (12 and 14) mounted on each side of an implement (6). The bottom portion of each receiving side has a bottom U-shaped member (28) which engages the lower pin at the same time a top U-shaped member (26) proximate the upper portion of each receiving side engages the upper pin. A fold-up and fold-down dog 32 positively locks the upper pin within the upper U-shaped member, maintaining both the upper and lower pins within the U-shaped members of the quick attachment mechanism.

6 Claims, 3 Drawing Sheets

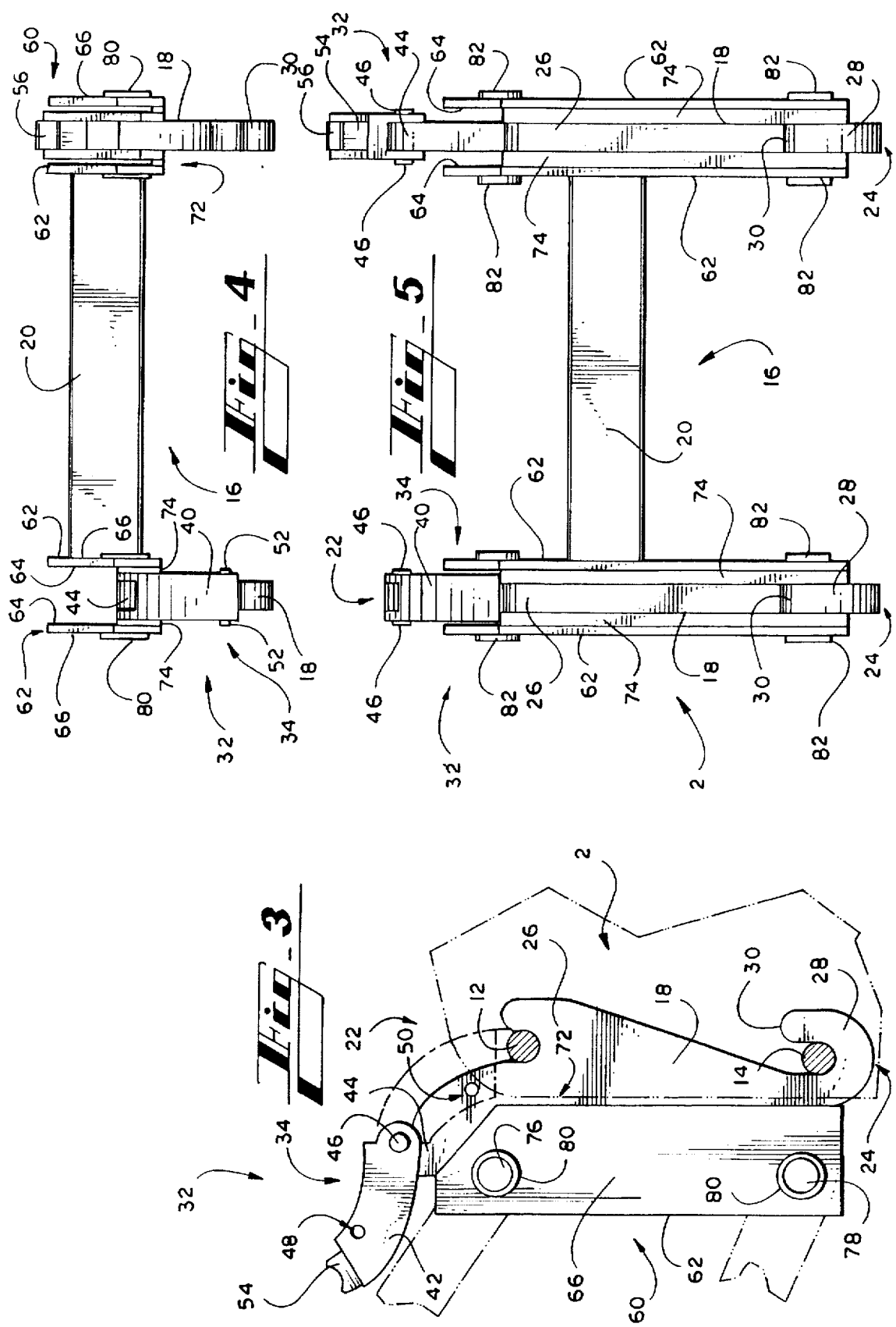

MECHANISM ALLOWING QUICK IMPLEMENT ATTACHMENT TO TRACTORS

BACKGROUND OF THE INVENTION

I. Field of the Invention.

The present invention relates generally to the field of hitches. More particularly, the present invention relates to coupling units for removably attaching an implement to a prime mover quickly and easily by means of a coupling unit.

II. Description of the Related Art.

Tractors and other load carrying vehicles often utilize several implements, such as brush cutters, scoops, blades, forks, grapples and baskets, to complete a job. Generally, the vehicles are provided with a pair of laterally spaced side arms which are usually mounted on the front ends of the vehicles. Attaching one implement to the side arms is often accomplished by an operator maneuvering the vehicle into alignment with the implement and mounting the implement across the outer ends of the side arms. This procedure can be made faster, easier and safer by use of a coupling unit that is strong, has tight construction and provides quick and secure locking of the attachment to the side arms. There are several devices of varying design and construction which provide to some degree quick attaching capabilities.

A latch control means described in U.S. Pat. No. 3,572,759 issued to Baugh et al. has a three-hook, remote controlled hitch adaptor pivotally mounted to a rear end of a tractor. All three hooks engage mating pins of the implement. The two lower most hooks have remote controlled, pivoting latches which are biased in the closed position by springs. When the mating pin is placed into the hook, the latch is pushed rearwardly by the mating pin until the pin seats in the hook. The latch then pivots forward, engages the mating pin and locks the mating pin within the hook until released by the remote control. This latch control means requires the latch to be in contact with the mating pin and does not encircle the mating pin to lock it within the hook.

U.S. Pat. No. 4,397,604 issued to McCain describes a releasable bucket and other tool connection for a backhoe. This two-point bucket support has a forwardly facing hook for receiving the front support pin of a bucket and a downwardly facing notch which receives a rear pin on the bucket. A second hook, which is pivotally attached to the support, pivots under and engages the rear pin of the bucket to retain the rear pin within the notch. A pair of tension springs biases the second hook toward the notch in a latched position. Additionally, the weight of the bucket urges the second hook to the latched position, making removal of the implement more difficult.

A quick attachment carrier assembly described in U.S. Pat. No. 4,436,477 issued to Lenertz et al. has a pair of spaced apart carriers. Each carrier includes a pair of vertically spaced apart notches which matingly engage transverse pins on brackets mounted on the implement. The top notches open generally upwardly while the bottom notches open generally forwardly toward the implement. Adjacent the lower notches are pivotal hooks, which can be simultaneously actuated through a single lever. The hooks are positively locked in either the latched or unlatched position by spring-loaded plungers.

U.S. Pat. No. 5,141,385 issued to Tibbatts et al. describes an implement attachment coupler having a pair of spaced apart side plates. Similar to the Lenertz et al. device, each side plate has a pair of vertically spaced apart slots which matingly engage transverse pins on the implement. The top slots open generally upwardly while the bottom slots open generally forwardly toward the implement. Pivotally mounted adjacent to the upper slots are latches which are pivoted into contact with the pins and secured in place by locking pins. When the latch does not contact the pins of the implement, the implement is not secured within the coupler.

SUMMARY OF THE INVENTION

In accordance with the present invention and the contemplated problems which have and continue to exist in this field, the objectives of this invention are to provide a mechanism that allows quick attachment of an implement to a tractor which:

saves time and labor in changing from one implement to another;

can be utilized in heavy duty applications;

secures the implement to a vehicle to withstand vigorous operation; and is easy to install.

This invention accomplishes the above and other objectives and overcomes the disadvantages of the prior art by providing a mechanism allowing quick implement attachment to tractors that is simple in design and construction, inexpensive to fabricate, and easy to use. The mechanism utilizes a single coupling unit having two receiving sides interconnected by a longitudinal beam. Each receiving side of the mechanism will engage a pair of vertically aligned pins mounted on each side of the implement. The bottom portion of each receiving side has a U-shaped member which engages the lower pin at the same time a generally U-shaped member proximate the upper portion of each receiving side engages the upper pin. A fold-up and fold-down dogging system positively locks the upper pin within the upper U-shaped member, maintaining both the upper and lower pins within the U-shaped members of the quick attachment mechanism. To detach the implement, an operator manually releases the dogging system and then moves the prime mover away from the implement. Connection is done in the reverse procedure. It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Other objects, advantages and capabilities of the invention will become apparent from the following description taken in conjunction with the accompanying drawings showing the preferred embodiment of the invention.

BRIEF DESCRIPTION OF THE DRAWINGS

The invention will be better understood and the above objects as well as objects other than those set forth above will become apparent when consideration is given to the following detailed description thereof. Such description makes reference to the annexed drawings wherein:

FIG. 3 is a side, elevation view of the mechanism;

FIG. 4 is a top view of the mechanism; and

FIG. 5 is a front, elevation view of the mechanism.

DESCRIPTION OF THE PREFERRED EMBODIMENTS

Figure 1:
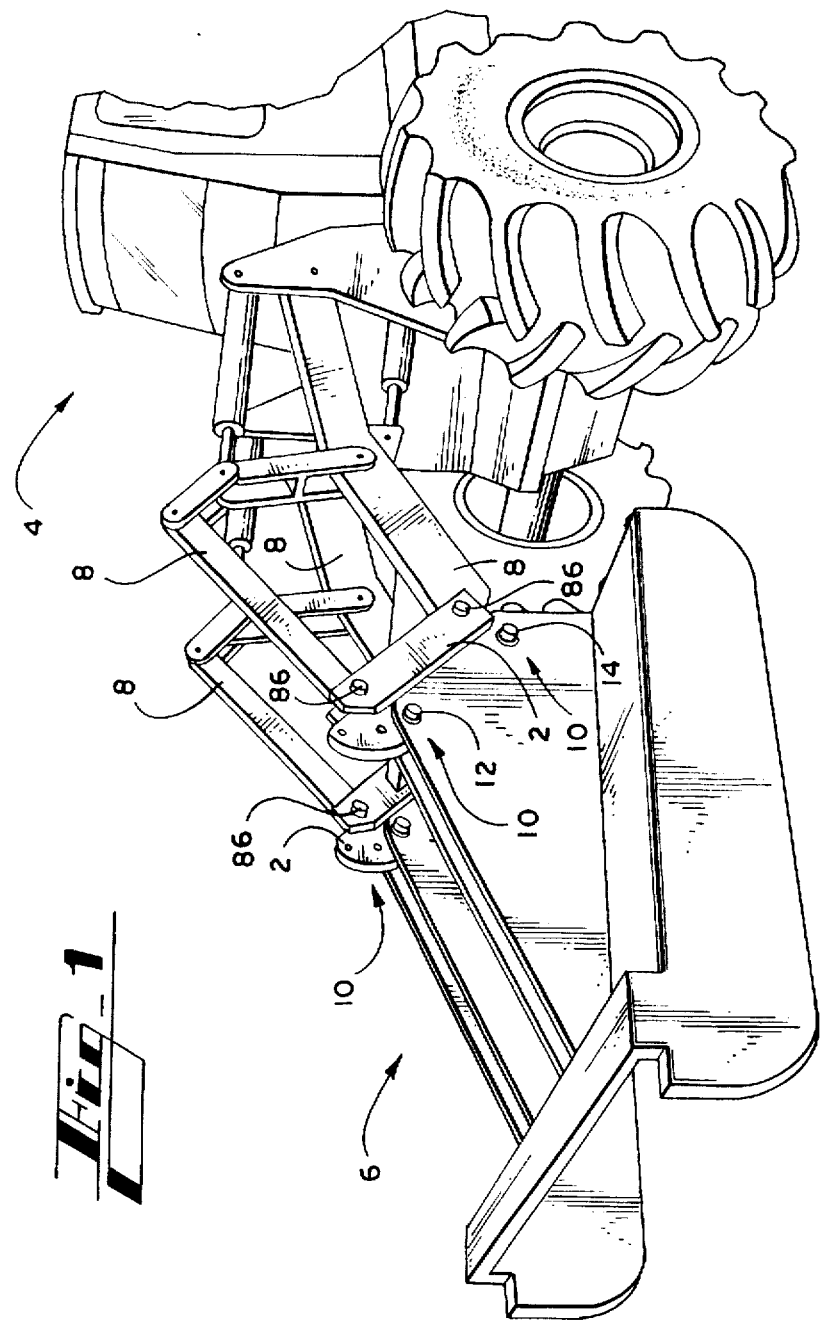
FIG. 1 is a partial, perspective view of a tractor fitted with a mechanism allowing quick implement attachment to tractors in accordance with the present invention.

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. FIG. 1 of the drawings illustrates a quick implement attachment mechanism 2 of the present invention removably fitted onto a heavy-duty front end loader styled tractor 4 or vehicle. Also shown is an implement 6 removably secured to the mechanism 2. Extending from the tractor 4 are two pairs of vertically spaced apart arms 8 having coupling ends 10 distally located from the tractor 4. At each coupling end 10 are horizontal mounting ports (not shown). Mounted to the implement 6 are a pair of laterally spaced apart upper transverse pins 12 and a pair of laterally spaced apart lower transverse pins 14, which are located beneath the upper pins 12.

Referring now to FIGS. 2 through 5, the mechanism 2 has a frame 16 comprising a pair of laterally spaced apart receiving sides 18 and an elongated beam 20 disposed between and operatively mounted to the receiving sides 18. Each receiving side has a top end 22 and a bottom end 24. Depending from each receiving side 18 proximate the top end 22 is an upwardly open top U-shaped member 26 adapted to receive an upper transverse pin 12. Similarly, proximate the bottom end 24 of each receiving side 18 is a depending, upwardly open bottom U-shaped member 28 adapted to receive a lower transverse pin 14. While the upper transverse pin 12 is secured within the top U-shaped member 26, the lower transverse pin 14 is maintained in seated arrangement within the bottom U-shaped member 28 by an apex 30 having sufficient height to prevent the lower transverse pin 14 from disengaging the bottom U-shaped member 28. As long as the lower transverse pin 14 is properly seated within the bottom U-shaped member 28 prior to the upper transverse pin 12 being secured within the top U-shaped member 26, the implement 6 can remain operatively secured to the tractor 4.

Figure 2:
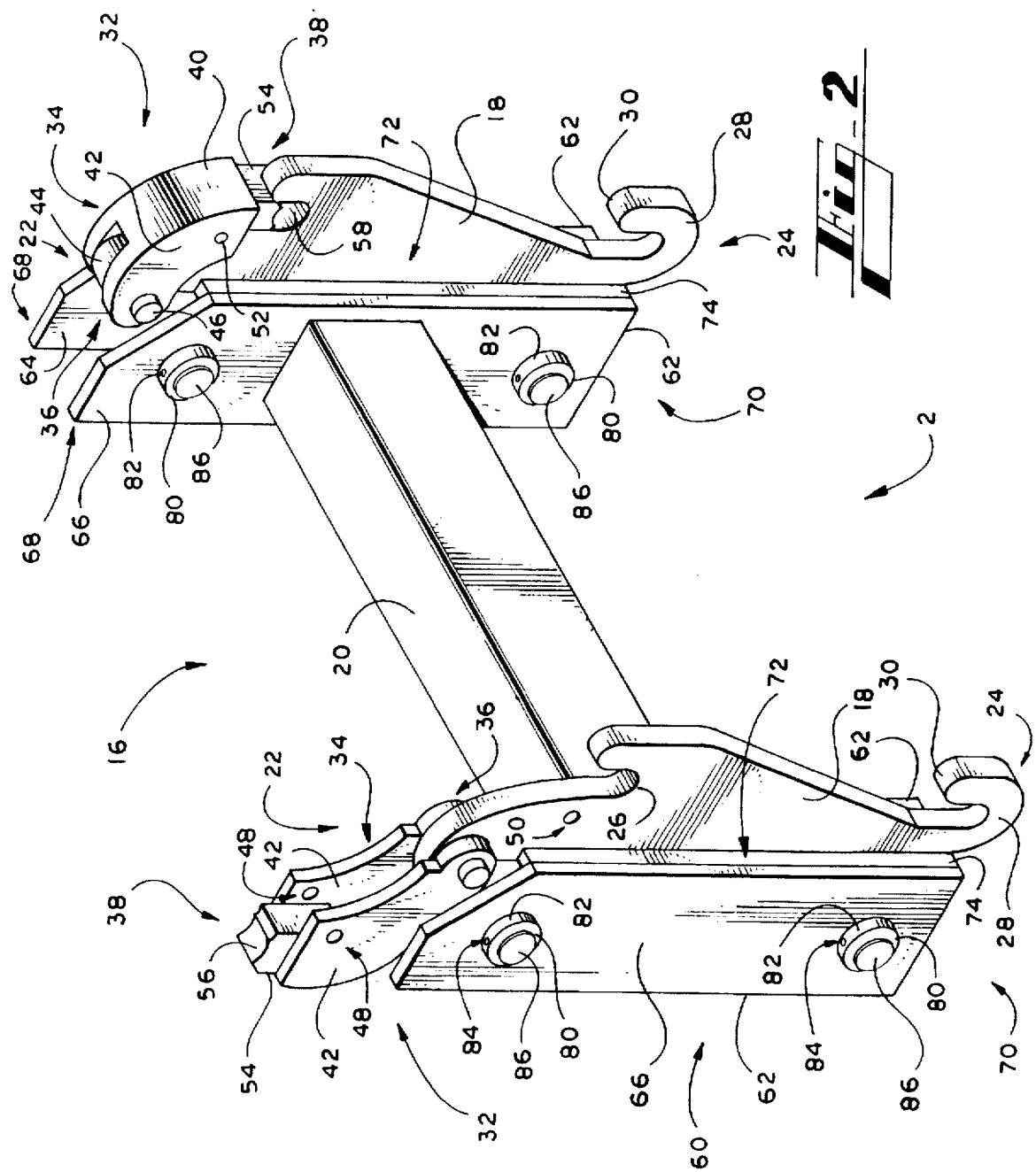
FIG. 2 is a perspective view of the mechanism.

Disposed proximate the top end 22 of each receiving side 18 is a dog 32 for extending over the top U-shaped member 26 and removably securing the upper transverse pin 12 within the top U-shaped member 26. The dog 32 has an elongated body 34, a first dog end 36 and a second dog end 38. As illustrated in FIGS. 2 and 3, the body 34 has a back 40 and spaced apart and opposing dog sides 42 depending from the back 40.

Operationally, the first dog end 36 is pivotally mounted to the receiving side 18 proximate the top U-shaped member 26. Proximate the first dog end 36 of each dog side are dog pivot pin bores (not shown) that are concentrically aligned along a first lateral axis disposed between the pivot pin bores. Extending upwardly from the top end 22 of each receiving side 18 is a pivot member 44. Disposed through the pivot member 44 is a side pivot pin bore (not shown). The first dog end 36 is placed over the pivot member 44 so that the dog pivot pin bores are concentrically aligned with the side pivot pin bore. A pivot pin 46 is disposed through the dog pivot pin and side pivot pin bores to pivotally mount the first dog end 36 to the receiving side 18.

The second dog end 38 is removably mounted to the receiving side 18 to removably secure the mechanism 2 to the tractor 4. Each dog side 42 has a dog locking pin bore 48 located proximate the second dog end 38, which is concentrically aligned along a second lateral axis disposed between the dog locking pin bores 48. The receiving side 18 has a side locking pin bore 50 disposed to be concentrically aligned between the dog locking pin bores 48 along the second lateral axis. In the preferred embodiment, the body 34 extends across the open portion of the top U-shaped member 26. A locking pin 52 is removably disposed through the dog locking pin and side locking pin bores 48 and 50 to releasably secure the upper transverse pin 12 within the top U-shaped member 26 and defines a closed position. Extending beyond the second dog end 38 is a pin engaging member 54. The pin engaging member 54 has a pin engaging surface 56 adapted to engage the upper transverse pin 12. When the dog 32 is in the closed position, the pin engaging member 54 extends into the opening of the top U-shaped member 26 and the pin engaging surface 56 and the top U-shaped member define a chamber 58 to removably secure the upper transverse pin 12.

Removably mounting the mechanism 2 to the tractor 4 is accomplished by a pair of spaced apart mounting brackets 60 mounted to the frame 16 proximate each receiving side 18. Each mounting bracket 60 has a pair of laterally spaced apart plates 62 to receive and engage the arms 8 of the tractor 4. The plates 62 have inner faces 64, outer faces 66, a plate top 68, a plate bottom 70 and a plate front 72. In the preferred embodiment, each mounting bracket 60 is arranged such that the receiving side 18 is disposed between the plates 62. This configuration has at least one plate 62 mounted on the outer face 66 to the beam 20 and the receiving side 18 mounted to the plates 62 on the inner faces 64 proximate the plate fronts 72. To increase the separation between the plates 62 so that the arms 8 can be disposed between the inner faces 64 of the mounting brackets 60, extensions 74 are disposed between and mounted to each plate 62 and the receiving side 18. A single plate 62 is satisfactory for the mounting bracket 60, but dual plates 62 improve structural strength and stability in heavy duty applications of the tractor 4 and the implement 6.

Disposed proximate each plate top 68 and above the beam 20 is an upper plate bore 76. The upper plate bores 76 are concentrically aligned with one another along an upper longitudinal axis. Similarly, a lower plate bore 78 is disposed proximate each plate bottom and below the upper plate bore 76 and the beam 20. The lower plate bores 78 are likewise concentrically aligned with one another along a lower longitudinal axis. A flange 80 having a circumferential flange surface 82 is concentrically mounted with each upper and lower plate bore 76 and 78 on the outer face 66 of the plate 62. The flanges 80 mounted on the plate 62 distally located from the beam 20 have opposing flange holes 84 concentrically aligned along a diametric axis of the respective flange 80 through the flange surface 82. Coupling pins 86 are inserted through the upper and lower plate bores 76 and 78 with the respective mounting ports of the arms 8 disposed between the upper and lower plate bores 76 and 78. The coupling pins 86 are removably secured within the upper and lower plate bores 76 and 78 and the respective mounting ports by a bolt and nut assembly (not shown) disposed through the flange holes 84 to engage a coupling pin bore (not shown).

It is foreseeable that the dogs 32 could be remotely controlled from the tractor 4 and, therefore, this provision is considered t part of the invention hereof.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A mechanism for quick implement attachment to vehicles, comprising:

- a pair of laterally spaced apart upper transverse pins mountable to the implement;
- a pair of laterally spaced apart lower transverse pins mountable to the implement beneath the upper pins;
- a pair of laterally spaced apart receiving sides, each receiving side having an upwardly open top U-shaped member adapted to receive an upper transverse pin and an upwardly open bottom U-shaped member adapted to receive a lower transverse pin;
- a dog disposed on each receiving side for extending over the top U-shaped member to secure the upper transverse pin within the top U-shaped member and hence securing the lower transverse pin within the bottom U-shaped member, the dog having an elongated body, a first dog end and a second dog end, the first dog end being pivotally mounted to the receiving side proximate the top U-shaped member, the second dog end being removably mounted to the receiving side and having a pin engaging member, the pin engaging member having a pin engaging surface adapted to engage the upper transverse pin, and the body having a back and spaced apart and opposing dog sides depending from the back;
- each dog side having a dog pivot pin bore proximate the first dog end, each dog pivot pin bore being concentrically aligned along a lateral axis disposed between the pivot pin bores, the receiving side having a side pivot pin bore disposed to be concentrically aligned between the dog pivot pin bores;
- a pivot pin disposed through the dog pivot pin and side pivot pin bores to pivotally mount the first dog end to the receiving side; and
- coupling means for coupling the mechanism to the vehicle.

2. A mechanism for quick implement attachment to vehicles, comprising:

- a pair of laterally spaced apart upper transverse pins mountable to the implement;
- a pair of laterally spaced apart lower transverse pins mountable to the implement beneath the upper pins;
- a pair of laterally spaced apart receiving sides, each receiving side having an upwardly open top U-shaped member adapted to receive an upper transverse pin and an upwardly open bottom U-shaped member adapted to receive a lower transverse pin;
- a dog disposed on each receiving side for extending over the top U-shaped member to secure the upper transverse pin within the top U-shaped member and hence securing the lower transverse pin within the bottom U-shaped member, the dog having an elongated body, a first dog end and a second dog end, the first dog end being pivotally mounted to the receiving side proximate the top U-shaped member, the second dog end being removably mounted to the receiving side and having a pin engaging member, the pin engaging member having a pin engaging surface adapted to engage the upper transverse pin, and the body having a back and spaced apart and opposing dog sides depending from the back;
- each dog side having a dog locking pin bore proximate the second dog end, each dog locking pin bore being concentrically aligned along a lateral axis disposed between the dog locking pin bores, the receiving side having a side locking pin bore disposed to be concentrically aligned between the dog locking pin bores while the pin engaging surface engages the upper transverse pin;
- a locking pin removably disposed through the dog locking pin and side locking pin bores to releasably secure the upper transverse pin within the top U-shaped member; and
- coupling means for coupling the mechanism to the vehicle.

3. A mechanism for quick implement attachment to vehicles, comprising:

- a pair of laterally spaced apart upper transverse pins mountable to the implement;
- a pair of laterally spaced apart lower transverse pins mountable to the implement beneath the upper pins;
- a pair of laterally spaced apart receiving sides, each receiving side having an upwardly open top U-shaped member adapted to receive an upper transverse pin and an upwardly open bottom U-shaped member adapted to receive a lower transverse pin;
- a dog disposed on each receiving side for extending over the top U-shaped member to secure the upper transverse pin within the top U-shaped member and hence securing the lower transverse pin within the bottom U-shaped member, the dog having an elongated body, a first dog end and a second dog end, the first dog end being pivotally mounted to the receiving side proximate the top U-shaped member, the second dog end being removably mounted to the receiving side and having a pin engaging member, the pin engaging member having a pin engaging surface adapted to engage the upper transverse pin, and the body having a back and spaced apart and opposing dog sides depending from the back;
- each dog side having a dog pivot pin bore proximate the first dog end, each dog pivot pin bore being concentrically aligned along a first lateral axis disposed between the pivot pin bores, the receiving side having a side pivot pin bore disposed to be concentrically aligned between the dog pivot pin bores,
- each dog side having a dog locking pin bore proximate the second dog end, each dog locking pin bore being concentrically aligned along a second lateral axis disposed between the dog locking pin bores, the receiving side having a side locking pin bore disposed to be concentrically aligned between the dog locking pin bores while the pin engaging surface engages the upper transverse pin,
- a pivot pin disposed through the dog pivot pin and side pivot pin bores to pivotally mount the first dog end to the receiving side;

a locking pin removably disposed through the dog licking pin and side locking pin bores to releasably secure the upper transverse pin within the top U-shaped member; and coupling means for coupling the mechanism to the vehicle.

4. A mechanism for quick implement attachment to vehicles, comprising:

a pair of laterally spaced apart upper transverse pins mountable to the implement;

a pair of laterally spaced apart lower transverse pins mountable to the implement beneath the upper pins;

a frame having a pair of laterally spaced apart receiving sides and an elongated beam disposed between and operatively mounted to the receiving sides, the receiving sides having a top end and a bottom end;

an upwardly open top U-shaped member adapted to receive an upper transverse pin depending from each receiving side proximate the top end;

an upwardly open bottom U-shaped member adapted to receive a lower transverse pin depending from each receiving side proximate the bottom end;

a dog disposed on each receiving side for extending over the top U-shaped member to form a chamber to secure the upper transverse pin within the top U-shaped member and hence securing the lower transverse pin within the bottom U-shaped member, the dog having an elongated body, a first dog end and a second dog end, the first dog end being pivotally mounted to the receiving side proximate the top U-shaped member, the second dog end being removably mounted to the receiving side and having a pin engaging member, the pin engaging member having a pin engaging surface adapted to engage the upper transverse pin, the body having a back and spaced apart and opposing dog sides depending from the back;

each dog side having a dog pivot pin bore proximate the first dog end, each dog pivot pin bore being concentrically aligned along a lateral axis disposed between the pivot pin bores, the receiving side having a side pivot pin bore disposed to be concentrically aligned between the dog pivot pin bores;

a pivot pin disposed through the dog pivot pin and side pivot pin bores to pivotally mount the first dog end to the receiving side; and a pair of spaced apart mounting brackets mounted to the frame proximate each receiving side for removably mounting the frame to the vehicle.

5. A mechanism for quick implement attachment to vehicles, comprising:

a pair of laterally spaced apart upper transverse pins mountable to the implement;

a pair of laterally spaced apart lower transverse pins mountable to the implement beneath the upper pins;

a frame having a pair of laterally spaced apart receiving sides and an elongated beam disposed between and operatively mounted to the receiving sides, the receiving sides having a top end and a bottom end;

an upwardly open top U-shaped member adapted to receive an upper transverse pin depending from each receiving side proximate the top end;

an upwardly open bottom U-shaped member adapted to receive a lower transverse pin depending from each receiving side proximate the bottom end;

a dog disposed on each receiving side for extending over the top U-shaped member to form a chamber to secure the upper transverse pin within the top U-shaped member and hence securing the lower transverse pin within the bottom U-shaped member, the dog having an elongated body, a first dog end and a second dog end, the first dog end being pivotally mounted to the receiving side proximate the top U-shaped member, the second dog end being removably mounted to the receiving side and having a pin engaging member, the pin engaging member having a pin engaging surface adapted to engage the upper transverse pin, the body having a back and spaced apart and opposing dog sides depending from the back;

each dog side having a dog locking pin bore proximate the second dog end, each dog locking pin bore being concentrically aligned along a lateral axis disposed between the dog locking pin bores, the receiving side having a side locking pin bore disposed to be concentrically aligned between the dog locking pin bores while the pin engaging surface engages the upper transverse pin, a locking pin removably disposed through the dog locking pin and side locking pin bores to releasably secure the upper transverse pin within the top U-shaped member; and a pair of spaced apart mounting brackets mounted to the frame proximate each receiving side for removably mounting the frame to the vehicle.

6. A mechanism for quick implement attachment to vehicles, comprising:

a pair of laterally spaced apart upper transverse pins mountable to the implement;

a pair of laterally spaced apart lower transverse pins mountable to the implement beneath the upper pins;

a frame having a pair of laterally spaced apart receiving sides and an elongated beam disposed between and operatively mounted to the receiving sides, the receiving sides having a top end and a bottom end;

an upwardly open top U-shaped member adapted to receive an upper transverse pin depending from each receiving side proximate the top end;

an upwardly open bottom U-shaped member adapted to receive a lower transverse pin depending from each receiving side proximate the bottom end;

a dog disposed on each receiving side for extending over the top U-shaped member to form a chamber to secure the upper transverse pin within the top U-shaped member and hence securing the lower transverse pin within the bottom U-shaped member, the dog having an elongated body, a first dog end and a second dog end, the first dog end being pivotally mounted to the receiving side proximate the top U-shaped member, the second dog end being removably mounted to the receiving side and having a pin engaging member, the pin engaging member having a pin engaging surface adapted to engage the upper transverse pin, the body having a back and spaced apart and opposing dog sides depending from the back;

each dog side having a dog pivot pin bore proximate the first dog end, each dog pivot pin bore being concentrically aligned along a first lateral axis disposed between the pivot pin bores, the receiving side having a side pivot pin bore disposed to be concentrically aligned between the dog pivot pin bores, each dog side having a dog locking pin bore proximate the second dog end, each dog locking pin bore being concentrically aligned along a second lateral axis disposed between the dog locking pin bores, the receiving side having a side locking pin bore disposed to be concentrically aligned between the dog locking pin bores while the pin engaging surface engages the upper transverse pin;

a pivot pin disposed through the dog pivot pin and side pivot pin bores to pivotally mount the first dog end to the receiving side;

a locking pin removably disposed through the dog locking pin and side locking pin bores to releasably secure the upper transverse pin within the top U-shaped member; and a pair of spaced apart mounting brackets mounted to the frame proximate each receiving side for removably mounting the frame to the vehicle.

* * * * *